2,773,801

DENTIFRICE COMPOSITIONS COMPRISING A NORMALLY-SOLID WATER SOLUBLE CONDENSATION PRODUCT OF ETHYLENE GLYCOL AND POLYPROPYLENE GLYCOL

Arthur L. Fox, Short Hills, N. J., assignor to Colgate-Palmolive Company, a corporation of Delaware No Drawing. Application July 3, 1952,
Serial No. 297,171

4 Claims. (Cl. 167—93)

The present invention relates to new and improved oral preparations, and, more particularly, to dentifrice preparations comprising a non-ionic surface active compound as described below.

Many commercial dentifrice preparations have incorporated therein minor amounts of anionic detergents to provide certain general detersive and foaming properties, e. g. water-soluble soaps, sulfate and sulfonated synthetic detergents.

It has now been discovered that dentifrice compositions comprising a normally solid water-soluble condensation product of ethylene oxide and polypropylene glycol exhibit improved and unique properties. A preferred embodiment of the present invention relates to a dental cream comprising water-insoluble polishing agent and a minor amount of such water-soluble non-ionic agent as a combination particularly suitable for the cleansing of the oral cavity. Various preferred embodiments will be apparent in the following description.

As indicated, the non-ionic agents employed in the compositions of the present invention are the normally solid water-soluble condensation products of ethylene oxide with propylene glycol, said product having a molecular weight of about 5,000 to about 10,000 and an ethylene oxide content of about 75–90% by weight. These materials are described also in the Journal of the American Oil Chemists Society, June 1952, pages 240–243. The polypropylene glycol represents the hydrophobic portion of the molecule, exhibiting sufficient water-insolubility per se at a molecular weight of at least about 900, such as about 900 to 2400, and preferably about 1200 to 1800. The increasing addition or condensation of ethylene oxide on a given water-insoluble polypropylene glycol tends to increase its water-solubility and increase its melting point until there is obtained a normally solid water-soluble product by the condensing of sufficient ethylene oxide. Such products may be designated by the following structure:

$HO—(C_2H_4O)_a(C_3H_6O)_b(C_2H_4O)_cH$ wherein $(C_3H_6O)_b$ is a polypropylene glycol residue of sufficient number of moles or molecular weight ($b$) to render the same water-insoluble or hydrophobic, and $(a)+(c)$ represent the number of moles of ethylene oxide condensed therewith to render the product normally solid and water-soluble.

It is preferred to use such products having a total molecular weight within the range of about 7,000 to 8,000. A typical commercial material which has given excellent results is designated as "Pluronic F–68". This material is considered to have a typical average molecular weight of about 7500, the hydrophobic polypropylene glycol being condensed with sufficient ethylene oxide until a normally solid water-soluble product is obtained which has an ethylene oxide content of about 80–90%. It has a melting point usually of about 51–54° C.

Many singular properties are exhibited by these specific non-ionic materials in the present oral compositions. A unique property concerns taste which is of vital consideration in formulations for oral use. Many other non-ionic compounds and other detergents have a fundamentally bitter, penetrating taste or other adverse taste characteristics which negative their use in oral preparations. The above non-ionic products, however, prove to be essentially tasteless, giving practically no sensation of taste at all in general. This property is further surprising since normally liquid ethylene oxide condensation products of hydrophobic polypropylene glycol exhibit usually a characteristically sharp and sour taste.

It has also been discovered that dentifrices containing these non-ionic active ingredients possess a marked cleansing power, as shown by the ability to remove characteristic tobacco tar stains or the like in the test described herein. Tobacco tar stains which are used in this test are variable and complex in nature, their chemical constitution not being completely known at this time. In general such tar stains are insoluble in alcohol and many other well known non-toxic organic solvents. While the invention is not limited to any particular theory it is believed that such stain-removal effects are at least in part due to the reactivity of the non-ionic compound with the complex tar materials or other stains to produce a more soluble product. In addition, the compositions possess added detersive and emulsifying power which contribute to the further cleansing of the oral cavity.

These non-ionic surface-active materials exert their beneficial functions in a dentifrice in widely variable proportons relative to the balance of the dentifrice composition. In the formulation of commercially acceptable dentifrices due consideration must be given to the type of composition, e. g. dental cream, or powder; to the specific effects desired, etc. In dental creams and powders it will usually be sufficient to use suitable amounts up to about 10%, and preferably up to about 5%, e. g. 0.1–5% though a minimum of about 0.5% is preferred however. They may be added in any sutiable form during manufacture dependent upon the type of dentifrice composition. For example, such non-ionic compounds may be utilized as an aqueous solution or in powder or flake form.

Any suitable practically water-insoluble polishing agent may be employed in the dentifrice preparations of the present invention. There is a relatively large number of such materials known in the art. Representative materials include, for example, calcium carbonate, dicalcium phosphate (anhydrous or hydrated), tricalcium phosphate, insoluble sodium metaphosphate, aluminum hydroxide, magnesium carbonate, calcium sulfate, etc., including suitable mixtures thereof. It is preferred to use the practically insoluble calcium and/or magnesium salts as polishing agents, and, more particularly, calcium carbonate and/or a calcium phosphate (e. g. dicalcium phosphate) in view of the excellent results obtained by their use. In general, these polishing agents will comprise a major proportion by weight of the solid ingredients. The amount utilized is variable and dependent somewhat upon the specific abrasive effects desired and the formulation, but will generally be up to 95% by weight of the total composition. In the case of a dental cream, the content of such polishing agents will generally be about 20–75%, usually about 30–65% and preferably about 40–60% by weight of the dental cream whereas in tooth powders the polishing agents will usually be a major proportion, such as about 70–95% by weight. Included within the scope of the invention are the dental powders, pastes, tablets, etc., which are designed for vigorous cleansing of the teeth by dentists. Such products may possess varying amounts of such water-insoluble agents as kieselguhr, pumice, bentonite, etc.

The use of such polishing agents in combination with the non-ionic compounds is highly beneficial in practice. Such mild abrasives supplement the stain removing properties, particularly with reference to such stains as food colors, mucin, etc. As an ultimate result the teeth are also polished resulting in a further protective action against staining. The use in those compositions of a water-insoluble calcium phosphate, preferably dibasic calcium phosphate dihydrate, in part or whole as polishing agent is particularly desirable because of the fineness of its particles and its relative freedom from abrasiveness and scratching.

The indicated non-ionic ingredients are, in general, compatible with other detergents by virtue of their non-ionic character. Thus, there may also be desirably included an added water-soluble foaming detergent since the non-ionic agents do not exhibit appreciable foaming activity in these compositions. These optional foaming surface-active agents are usually characterized by having a long aliphatic chain in the molecule and a water-solubilizing group. Suitable detergents may be anionic, non-ionic or cationic in structure but it is preferred to employ the organic sulfate and sulfonate detergents. These various detersive agents are known and include, for example, the water-soluble salt of higher fatty acid monoglyceride monosulfate detergent (e. g. sodium salts of monosulfated monoglycerides of mixed higher fatty acids derived from coconut oil), higher alkyl sulfate detergent (e. g. sodium lauryl sulfate), alkyl aryl sulfonate detergent (e. g. sodium dodecyl benzene sulfonate), higher alkyl sulfoacetate (e. g. sodium lauryl sulfoacetate), higher fatty acid amides of amino carboxylic acid (e. g. sodium N-lauroyl sarcoside), the conventional soaps of animal or vegetable fatty materials which are water-soluble salts of higher fatty acids (e. g. sodium soaps of mixed fatty acids of coconut oil), etc. These materials also aid in the removal of foreign matter from the teeth by detersive and emulsifying action, etc., and produce a desirable foaming action in combination with the non-ionic compounds in the dentifrice compositions. The foaming action and general solubility effects of these detergents aid in the ready penetration of the various ingredients into the more inaccessible tooth surfaces and thereby further promote the effectiveness of the dentifrice composition. In general, these foaming agents may be used in any suitable amount, such as up to about 20% by weight, dependent upon the type of preparation. In the case of dental creams and tooth powders, these detergents will generally be from about 0.5 up to about 10% by weight. The non-soap or synthetic detergents in creams or powders will usually be employed in an amount up to about 5% by weight.

An embodiment of the present invention relates to a dental cream. The various solid and liquid ingredients are proportioned in known manner to form a substantially uniform and homogeneous creamy mass which can be extruded from a collapsible tube, such as an aluminum or lead tube. The water-insoluble polishing agents are substantially in suspension, the final cream usually being set to a gel or the like. The non-ionic material should be suitably dissolved or dispersed in the liquid content of the cream for optimum effects. In this manner, such non-ionic compounds are already in solution and available for effective action immediately. In general, the liquid in the cream will comprise chiefly such materials as water, glycerine, sorbitol, propylene glycol, etc., including suitable mixtures thereof. It is usually advantageous to use a mixture of both water and a humectant or binder such as glycerine, sorbitol, etc. The total liquid content will generally be from about 20 to about 75% and usually about 30–65% by weight of the formulation. In aqueous-humectant mixtures referred to above, the water and the humectant will usually be from about 5–50% each, and preferably 10–40% each of the total ingredients which are proportioned to form a dental cream of desired consistency.

Other adjuvant materials may be similarly incorporated in suitable amounts. It is preferred to use a gelling agent such as the natural and synthetic gums and gum-like materials, e. g. Irish moss, gum tragacanth, sodium carboxymethylcellulose, starch, etc., usually in an amount up to 10% by weight of the dental cream, and preferably from 0.5–5%. Furthermore, such materials as soluble saccharin, flavoring oils (e. g. oils of spearmint, peppermint), coloring or whitening agents, antibiotics, therapeutic agents, preservatives, alcohol, etc. may be used as desired in proper amount.

The cleansing properties of formulations of the present invention may be confirmed by suitable tests. As an illustration of such cleansing effects, porous porcelain strips (¾″ x 4″ x ¼″) are swabbed with an aqueous-alcohol solution of tobacco juice to produce a uniform film-like stain. These strips are maintained temporarily in water which fixes the tobacco stains. Each strip is thereafter subject to 15,000 standardized strokes of a toothbrush mounted in a suitable toothbrushing apparatus. The toothbrush is treated initially with an aqueous slurry of the dental cream or other dentifrice to be tested before each series of tests. After washing and drying the various samples, the whiteness reflectance of each strip is measured by a spectrophotometer. The results obtained using dental creams containing about 45% polishing agent, a minor amount of water-soluble foaming detergent and about 2% of Pluronic F–68 in contrast to an otherwise equivalent dental cream free of such non-ionic agent are set forth in the table below. The numerical values in the table are reported in terms of percent reflectance, using the reflectance value of an unstained porcelain strip as a standard of 100%.

TABLE

| | Porcelain Strip | Percent Reflectance | Color |
|---|---|---|---|
| a | Unstained | 100.0 | Grayish white. |
| b | Stained | 75.4 | Brown to black. |
| c | Brushed with control dental cream. | 97.3 | Light brown. |
| d | Brushed with cream containing non-ionic agent. | 106.0 | Grayish white to white. |

The strain-removing efficacy of the dental cream of the present invention is self evident from the data. It may be noted also that the whiteness of the porcelain enamel strip treated with such dental cream was whiter and had greater light reflectance than the originally unstained porcelain which is also evident to the eye.

Another embodiment of the present invention relates to a dental or tooth powder. Such products may be prepared by mechanical admixture of the various ingredients, such as a major proportion of polishing agent, and a minor proportion or amount of the non-ionic compounds with optional amount of water-soluble foaming detergent, flavor ingredients, etc. The amount of moisture should be usually at a minimum in order to maintain an essentially free-flowing product in relatively fine particle form. With the use of such products in the usual manner, the non-ionic compounds will be suitably dissolved or dispersed in the aqueous slurry formed in the mouth and will exert its cleansing power in combination with the other ingredients such as the polishing agent and foaming detergent.

The pH of the final formulations of the present invention is variable, and, therefore, the products may have any suitable pH value in solution. Where reference is made to pH values in the specification and claims, it has reference to the pH in the case of a dental cream or powder as determined on a 20% aqueous slurry of said cream or powder. Thus, it is generally desired that the pH of the product under the testing conditions indicated be from about 5 up to about 10, and preferably from about 5.5 to 9, with optimum desired effects at a substantially neutral pH value in solution, e. g. about 6 to 8.

The following specific examples are further illustrative of the nature of the present invention, but it is to be understood that the invention is not limited thereto. All amounts of the various ingredients are by weight unless otherwise specified.

Example I.—Dental cream

| | Percent |
|---|---|
| Glycerine | 28.40 |
| Irish moss | 0.95 |
| Saccharin, soluble | 0.15 |
| Sodium benzoate | 0.50 |
| Water | 14.80 |
| Foaming detergent | 3.70 |
| Dicalcium phosphate dihydrate | 48.30 |
| Flavor | 1.20 |
| Non-ionic agent [1] | 2.00 |

[1] Ethylene oxide condensation product with hydrophobic polypropylene glycol, said product having a molecular weight of about 7500 and an ethylene oxide content of about 80–90%.

The dental cream is prepared in the usual manner. The Irish moss is suspended in the glycerin, and the soluble saccharin, sodium benzoate, and the water are added with stirring at about 165° F. The foaming detergent (sodium salt of sulfated monoglycerides of higher fatty acids derived from coconut oil) and polishing agent are then added to the warm mix and the mixture is stirred thoroughly. The mixture is chilled to about 45° F. after which the non-ionic agent and the flavor are added with stirring. The finished mix is then milled to produce a smooth homogeneous cream paste having a substantially neutral pH value which is subsequently packaged in collapsible aluminum or lead tubes. Evaluation tests show that this dental cream has improved taste and markedly better stain removal action than corresponding dentifrices which do not contain the non-ionic agent, in addition to other advantages.

Other suitable formulations productive of desired results containing the non-ionic agent of Example I illustratively and which may be prepared in the usual manner are:

Example II.—Dental cream

| | Percent |
|---|---|
| Dicalcium phosphate dihydrate | 26.0 |
| Insoluble sodium metaphosphate | 26.0 |
| Non-ionic agent | 1.0 |
| Sodium lauryl sulfate | 2.5 |
| Glycerine | 25.0 |
| Water | 18.0 |
| Gum, flavor, etc., q. s. | |

Example III.—Dental cream

| | Percent |
|---|---|
| Dicalcium phosphate dihydrate | 50.0 |
| Non-ionic agent | 1.0 |
| Sodium N-lauroyl sarcoside | 2.0 |
| Disodium diacid pyrophosphate | 1.0 |
| Glycerine | 29.2 |
| Water | 15.5 |
| Gum, flavor, etc., q. s. | |

Example IV.—Tooth powder

| | Percent |
|---|---|
| Dicalcium phosphate dihydrate | 70.0 |
| Calcium carbonate | 20.8 |
| Sodium coconut monoglyceride monosulfate | 4.0 |
| Non-ionic agent | 3.0 |
| Soluble saccharin | 0.2 |
| Flavor | 2.0 |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention what is claimed is:

1. A dentifrice composition comprising a polishing material and about 0.1 to 10% by weight of a normally-solid water-soluble condensation product of ethylene oxide and polypropylene glycol, said product having a molecular weight of about 5,000 to about 10,000 and an ethylene oxide content of about 75–90% by weight.

2. A dentifrice composition comprising a polishing material and about 0.1 to 10% by weight of a normally-solid water-soluble condensation product of ethylene oxide and polypropylene glycol, said product having a molecular weight of about 7,500, an ethylene oxide content of about 80–90% by weight and a melting point of about 51–54° C.

3. A dentifrice composition comprising a polishing material, an anionic organic detergent and about 0.1 to 10% by weight of a normally-solid water-soluble condensation product of ethylene oxide and polypropylene glycol, said product having a molecular weight of about 5,000 to about 10,000 and an ethylene oxide content of about 75–90% by weight.

4. A dental cream comprising a liquid vehicle, a water-insoluble phosphate polishing material suspended therein, an anionic organic synthetic detergent, and from about 0.1 to 5% by weight of a normally-solid water-soluble condensation product of ethylene oxide and polypropylene glycol, said product having a molecular weight of about 7,500, an ethylene oxide content of about 80–90% by weight and a melting point of about 51–54° C.

References Cited in the file of this patent

UNITED STATES PATENTS

| | | |
|---|---|---|
| 2,519,665 | Klippert | Aug. 22, 1950 |
| 2,542,886 | Wach | Feb. 20, 1951 |

FOREIGN PATENTS

| | | |
|---|---|---|
| 260,995 | Switzerland | Apr. 15, 1949 |
| 601,801 | Great Britain | May 12, 1948 |

OTHER REFERENCES

Goodman: Cosmetic Dermatology, McGraw-Hill Book Company, Incorporated, New York and London, 1st edition, 1936, pages 421 to 422 and 425 to 428.

Wyandotte Chemicals Development News, pages 2283 to 2285, volume 30, Number 22, June 2, 1952.

Information on Applications of Pluronics, Wyandotte, pages 1 to 13, March 1, 1952.